CRYSTALLIZATION OF ALKALI METAL CHLORATE FROM AN ALKALI METAL CHLORATE-ALKALI METAL CHLORIDE SOLUTION

United States Patent Office 3,511,619

Patented May 12, 1970

3,511,619

CRYSTALLIZATION OF ALKALI METAL CHLORATE FROM AN ALKALI METAL CHLORATE-ALKALI METAL CHLORIDE SOLUTION

Willard A. Fuller, Grand Island, and Harry R. Oswald, Lewiston, N.Y., assignors to Hooker Chemical Corporation, Niagara Falls, N.Y., a corporation of New York Filed Nov. 30, 1965, Ser. No. 510,593
Int. Cl. C01d *1/30;* C01b *7/06*
U.S. Cl. 23—302 2 Claims

ABSTRACT OF THE DISCLOSURE

A process for increasing the quantity of sodium chlorate precipitate from a non-saturated aqueous solution of sodium chlorate and sodium chloride which comprises adding sodium chloride and cooling the solution.

This invention relates to the crystallization of an alkali metal chlorate from a solution of alkali metal chlorate and alkali metal chloride. More particularly, this invention relates to a method for crystallization of sodium chlorate from an aqueous solution of sodium chlorate and sodium chloride in a manner particularly suitable for use with continuous sodium chlorate production methods to produce a sodium chlorate material particularly suited for generating chlorine dioxide.

Sodium chlorate is commonly produced by the electrolysis of an aqueous solution of sodium chloride under conditions which produce a cell liquor containing both sodium chloride and sodium chlorate. Several electrolytic and combination electrolytic and chemical methods are known for producing sodium chlorate. Independent of the particular method utilized, sodium chlorate is most commonly produced in admixture with residual amounts of sodium chloride. The methods for separating sodium chlorate from the residual amounts of sodium chloride have generally been by multi-step evaporating and concentrating procedures followed by cooling to a temperature substantially below the temperature of the originally produced sodium chloride-sodium chlorate solution. In the evaporating and concentrating steps of these processes, the solubility of the sodium chloride is exceeded and solid salt is removed by filtration. This salt is then redissolved and returned to the electrolytic process. Thus, in previous processes, the sodium chlorate is not selectively removed until after an evaporation step.

It is an object of the present invention to provide a simplified method for separating sodium chlorate from a sodium chlorate-sodium chloride aqueous solution. It is another object of the present invention to provide a method for removing sodium chlorate from a solution of sodium chloride utilizing a minimum temperature change. A further object of the present invention is to provide a method for recovering sodium chlorate from a sodium chlorate-sodium chloride solution without the necessity of evaporation procedures. Yet, another object of the present invention is to provide a method particularly suitable for removing sodium chlorate from a sodium chlorate-sodium chloride solution in a continuous process wherein the mother liquor is subsequently returned to an electrolytic cell for the production of additional amounts of sodium chlorate. These and other objects will become apparent to those skilled in the art from the description of the invention which follows.

In accordance with the invention, a method is provided for crystallizing a chlorate from a solution of chloride and chlorate comprising saturating a chloride-chlorate solution obtained from a chlorate production method with chloride, feeding said saturated solution at about the saturation temperature to a crystallization zone, cooling said solution to thereby supersaturate the feed solution with respect to the chlorate and effecting the precipitation of the chlorate from said solution.

The present invention is particularly useful for producing crystalline sodium chlorate in a continuous process involving the electrolysis of an aqueous solution of sodium chloride. The conditions of crystallization can be regulated so that any amount of sodium chloride ranging from a fraction of one percent to 10 percent or more by weight of the crystallized sodium chlorate can be coproduced with the sodium chlorate and/or retained therewith to provide a composition particularly suited for the production of chlorine dioxide. A further distinct advantage in the present process is that the cooling to crystallize a crop of sodium chlorate crystals from the sodium chlorate-sodium chloride solution is drastically reduced, to such an extent that the heating and cooling for continuous operation in conjunction with electrolytic cells may be substantially reduced or even eliminated. Further, in most instances, ordinary cooling water can be utilized to provide cooling, thus eliminating expensive refrigeration, evaporation and heating equipment. The present process can be operated over a wide range of temperatures to thereby correspond and complement operating temperatures for any sodium chlorate electrolytic and/or chemical method for producing chlorates.

The invention will be further described with reference to the drawings in which

The process of the present invention is suitable for the crystallization of alkali metal chlorates, such as sodium chlorate, potassium chlorate, lithium chlorate, rubidium chlorate, cesium chlorate, and the like, and alkaline earth chlorates such as magnesium chlorate, calcium chlorate, strontium chlorate, barium chlorate, and the like, from solutions containing their respective chlorides. However, because of the ready availability and the favorable solubilities, sodium chlorate is the normally produced chlorate from which other chlorates are formed. Since sodium chlorate is the most commonly produced chlorate, the invention will be further described with particular reference to sodium chlorate. However, in describing sodium chlorate it is to be noted that other chlorates may be crystallized from their respective chlorides in a manner similar to that described for sodium chlorate.

In referring to the flow sheet, chlorates are produced by the electrolysis of an aqueous solution of sodium chloride in an electrolytic cell, at 10. The electrolysis is normally carried out commercially in electrolytic cells without diaphragms. Thus, in electrolyzing the aqueous solution of sodium chloride, chlorine is produced at the anode and hydroxyl ions are produced at the cathode and these react to yield hypochlorite, which rapidly converts to sodium chlorate. Alternatively, the electrolysis can be effected in a chlor-alkali diaphragm cell wherein chlorine produced at the anode and caustic produced at the cathode are combined and reacted apart from the electrolytic cell under conditions which favor the reaction to produce sodium chlorate.

Depending upon the particular type of electrolytic cell used, the materials of which the electrodes are constructed and various other factors, the electrolytic cells may operate in the temperature range of about 20 degrees centigrade up to as high as about 120 degrees centigrade. A common factor in any method for producing sodium chlorate using an aqueous electrolysis step is that the electrolyte contain a certain minimum quantity of sodium chloride to provide an efficient electrolysis. Therefore, conventional electrolytic processes continuously or periodically add replenishing amounts of sodium chloride to the electrolyte while increasing the concentration of sodium chlorate.

Independent of the particular temperature ranges utilized, or the particular method of chlorate production used, the present invention is readily adapted for use in conjunction therewith.

Figure 2:
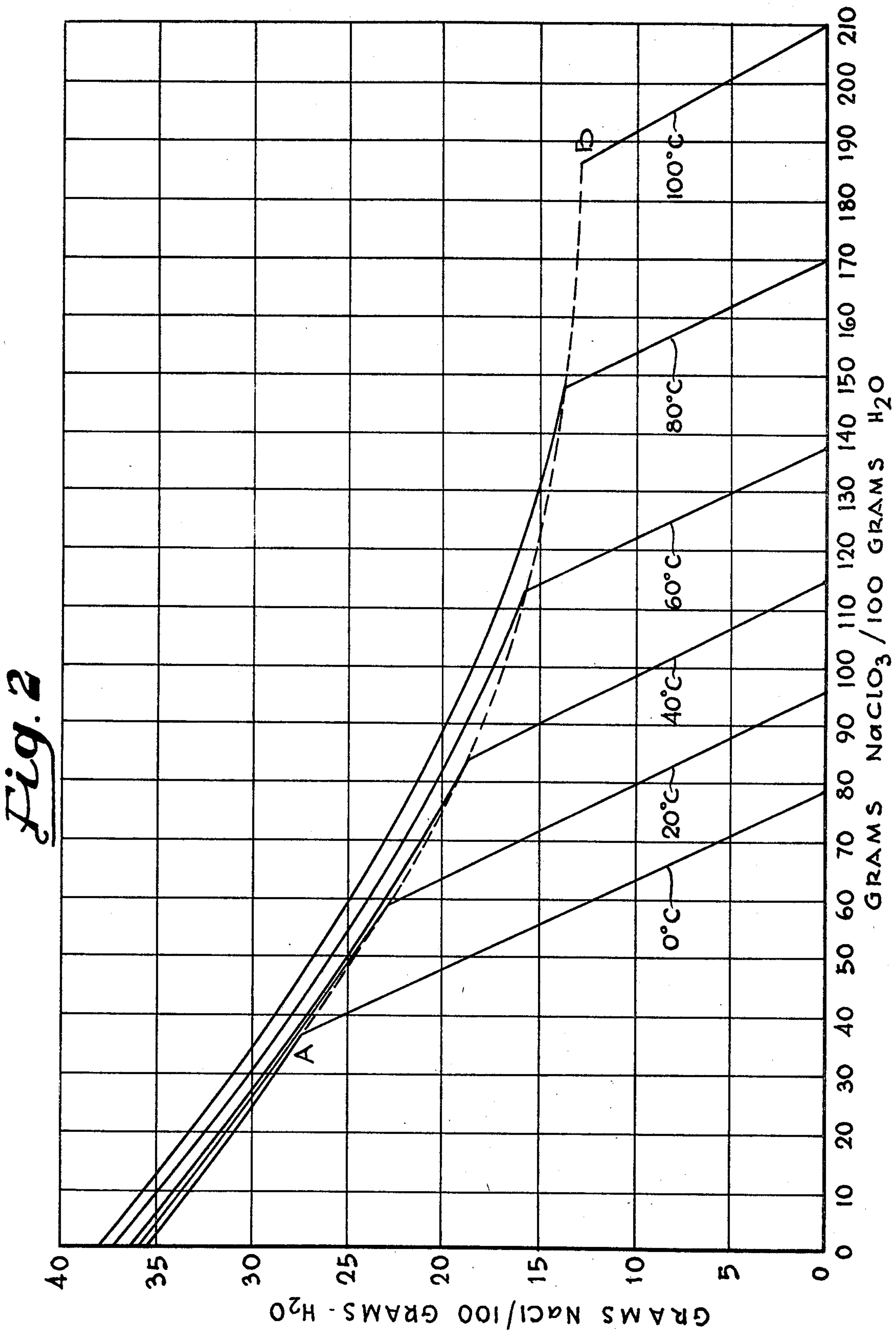
FIG. 2 is a graph illustrating the solubility relationship between sodium chloride and sodium chlorate in the temperature range of zero to 100 degrees centigrade.

From the chlorate production step 10, an aqueous solution of chlorates is passed to a salt saturator or Lixator 12 wherein sodium chloride 14 is dissolved in the aqueous sodium chlorate solution to saturate the solution with respect to sodium chloride. The salt saturator is preferably operated at about the temperature of the chlorate manufacturing process but can also be operated at higher or lower temperatures. For any given temperature and concentration of sodium chlorate, the amount of sodium chloride added to produce a saturated solution with respect to sodium chloride is readily ascertained by reference to FIG. 2. The line A–B on the graph divides the solubilities in a manner such that below line A–B the solid phase is sodium chlorate and above line A–B the solid phase is sodium chloride. A sodium chlorate solution coming from a chlorate production process normally has a sodium chloride concentration of about 10 grams or more per 100 grams of water. Depending on the sodium chlorate concentration and temperature, about 2 to 20 grams of NaCl per 100 grams of water can be added to such a solution to reach the NaCl saturation point.

After saturation with NaCl, the aqueous solution from salt saturator 12 is passed to crystallizer 16 to effect the crystallization of sodium chlorate. Since the solution fed to crystallizer 16 is saturated with respect to sodium chloride at a given temperature, a lowering of the temperature causes oversaturation with respect to sodium chlorate, and then effects the precipitation of a crop of sodium chlorate crystals. The amount of sodium chlorate precipitated depends largely on the lowering of the solution temperature. By reference to FIG. 2, the amount of sodium chlorate crystallized for any given change in temperature can be determined, based on the sodium chloride and sodium chlorate concentrations. For instance, if the solution fed to salt saturator 12 is a cell liquor containing 70 grams of sodium chlorate and 17.5 grams of sodium chloride per 100 grams of water at 40 degrees centigrade, the cell liquor is first saturated with an additional amount of sodium chloride in salt saturator 12 by adding salt to increase the sodium chloride concentration to about 22 grams per 100 grams of water. On cooling to 20 degrees centigrade in crystallizer 16, about 8 grams of sodium chlorate per 100 grams of water is crystallized. This is a suitable chlorate removal for most continuous processes. A larger temperature change will, of course, give a greater crop of chlorate crystals. Compared to the prior art, the same solution and temperature change without the salt addition will precipitate only about one gram of sodium chlorate per 100 grams of water.

Crystallizer 16 can be any conventional crystallizer, including evaporatively cooled crystallizers. If an evaporatively cooled crystallizer is used, a greater proportion of sodium chlorate can be removed with the same temperature drop due to the removal of water. In most instances, the crystallization is readily effected in a crystallizer which is cooled merely by cooling fluids such as water on a heat exchanger principle. Thus, cooling coils or other heat exchanger devices are positioned in the crystallizer or more preferably, a stream of liquor is withdrawn from the crystallizer, passed through a heat exchanger to remove heat and subsequently returned to the crystallizer as cooled liquor. Independent of the particular cooling method employed, the liquor in the crystallizer becomes supersaturated with respect to sodium chlorate because of reducing the temperature thereof. Therefore, depending on the cooling effected, a crop of chlorate crystals is precipitated upon the addition of or in the presence of seed particles of chlorate. At high levels of supersaturation, the crystallization is spontaneous. Under continuous operating conditions, chlorate particles present act as the seeding material.

The amount of cooling effected in the crystallizer determines the amount of crystals removed from the crystallizer liquor. The amount removed for any given concentration of chlorate at an initial sodium chloride saturation point can be determined by reference to FIG. 2. In continuous crystallization processes, particularly when the mother liquor is returned to an electrolytic cell for further reaction, the temperature change used to effect crystallization is about 10 to 60 degrees centigrade and more preferably about 20 to 40 degrees centigrade. Thus, the crystallizer operates in the temperature range of about zero to 70 degrees centigrade on sodium chloride saturated cell liquor fed to the crystallizer at a temperature of about 20 to 100 degrees centigrade.

Crystallized sodium chlorate is removed from the crystallizer 16 by withdrawing a stream of liquor from a settling zone in the crystallizer and passing it through liquid-solid separator 17. The chlorate crystals are therein removed and the mother liquor is returned to crystallizer 16. Liquid-solid separator 17 can be any liquid-solids separator or separation process such as a centrifuge or a filter. A cyclone separator is particularly useful when it is desirable to retain a portion of chloride with the chlorate crystals as when the product is to be used for chlorine dioxide generation.

Under continuous crystallizing conditions, clear mother liquor 20 is withdrawn from a quiet zone in crystallizer 16 for recycle to the chlorate production 10 process. The mother liquor can be fed directly to an electrolytic cell or may be further adjusted with brine 22 or water to obtain the most desired feed concentration by the addition of water and/or salt.

In addition to or as an alternative to the saturation of the chlorate-chloride feed solution with sodium chloride prior to passing the solution to the crystallizer, the mother liquor from liquids-solids separator 17 or another circulating stream can be saturated with salt prior to being returned to crystallizer 16, as exemplified by Lixator 24 in which sodium chloride 23 is dissolved in the mother liquor from separator 17. Using this further saturation, an additional yield of sodium chlorate is recovered at comparable temperatures.

The invention will be further described by the following examples. Unless otherwise indicated, all temperatures are in degrees centigrade and all parts are by weight.

EXAMPLE 1

Figure 1:
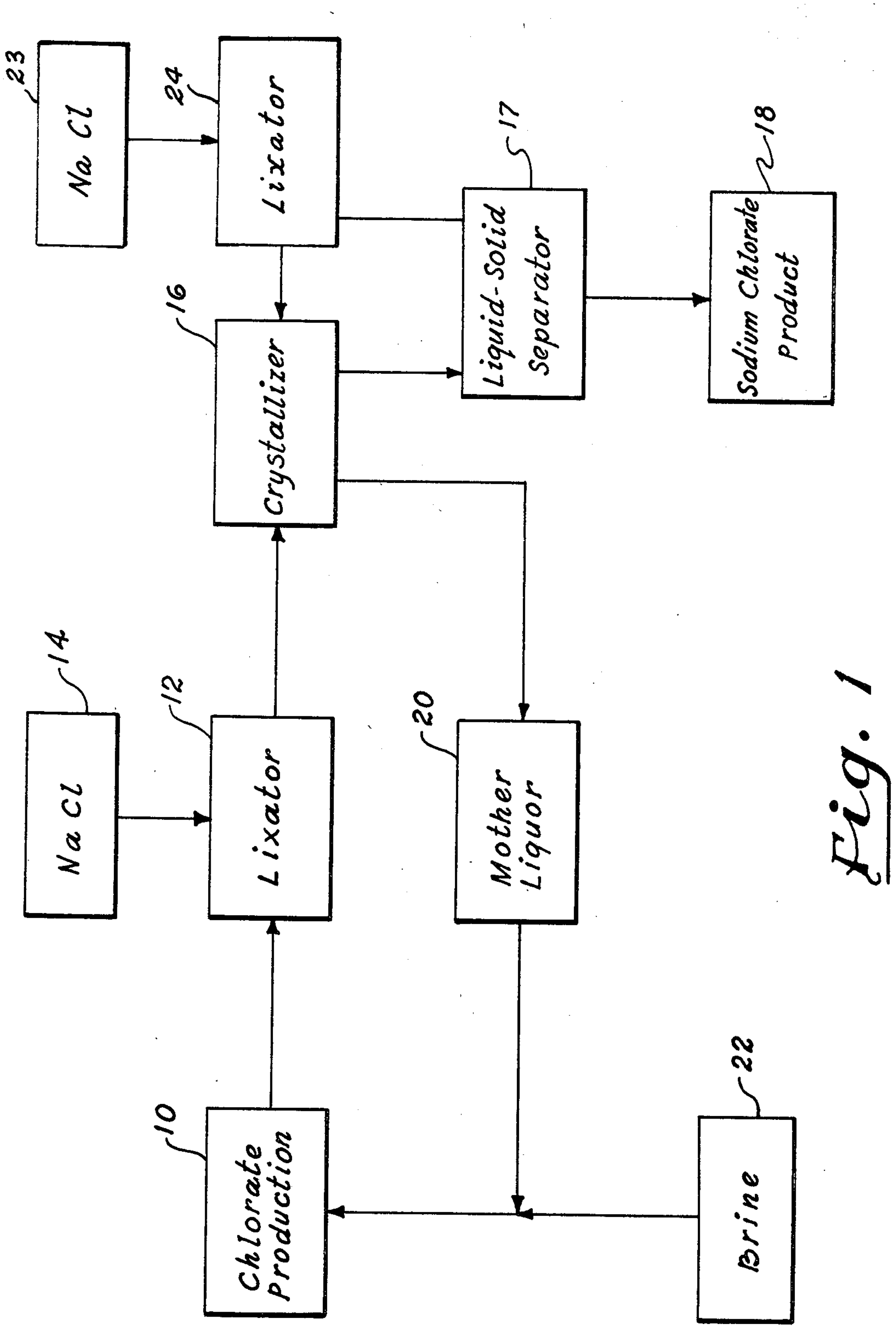
FIG. 1 is a flow sheet illustrating the process of the present invention.

The present crystallization method is utilized for removing sodium chlorate from cell liquor produced by a group of chlorate cells operating at 40 degrees centigrade. The liquid effluent flow rate from the group of cells is 78 gallons per minute at a temperature of 40 degrees centigrade. The concentration of sodium chlorate in the cell effluent liquor averages 68 pounds per 100 pounds of water and 18.8 pounds of sodium chloride per 100 pounds of water, the total liquid flow rate being 54,590 pounds per hour. This flow is passed to a salt saturator in accordance with the flow sheet of FIG. 1 and 870 pounds per hour of sodium chloride are dissolved in the cell effluent.

The liquid effluent is removed from the salt saturator at a rate of 55,460 pounds per hour at a temperature of 40 degrees centigrade. The salt concentration is increased to about 21.8 pounds per 100 pounds of water and the sodium chlorate concentration remains constant at about 68 pounds per 100 pounds of water. The flow rate from the salt saturator is about 79 gallons per minute.

The effluent liquor from the salt saturator is passed to a crystallizer having external heat exchange means capable of reducing the temperature to 20 degrees centigrade. The crystallizer has a capacity of 7,500 gallons, thus giving an average retention time at the given flow rate at about one hour and 30 minutes. Sodium chlorate crystallization occurs in the crystallizer at 20 degrees centigrade and the crystals settle to the bottom of the crystallizer. A stream of liquor and crystals are withdrawn from the bottom of the crystallizer and passed through a filter to remove the solids. The mother liquor is returned to the crystallizer. Nineteen hundred pounds per hour of sodium chlorate are separated by means of the filter. The filtrate is washed with about 400 pounds per hour of water and the wash water is returned to the chlorate production step. A total of 1,586 pounds per hour of washed sodium chlorate crystals is obtained.

From a quiet zone in the crystallizer, a stream of 77 gallons per minute of liquor is withdrawn for return to the electrolytic cells. This stream contains about 61.5 pounds of sodium chlorate per 100 pounds of water and about 21.8 pounds of sodium chloride per 100 pounds of water at a tmeperature of 20 degress centigrade. This mother liquor stream is further adjusted with brine solution to provide a feed rate to the electrolytic cells of about 79 gallons per minute at a sodium chloride concentration of about 22 pounds per 100 pounds of water.

As is readily seen by the example, the process of the present invention removes sodium chlorate from cell liquor without the requirement of evaporation and at a temperature differential substantially less than previously required for the same yield of chlorate crystals. The requirement for extensive heat exchange systems to cool the crystallizer liquor to about zero degrees centigrade is thus eliminated.

Alternatively, a sodium chlorate product containing up to about 10 percent sodium chloride is obtained from the crystallizer by using a cyclone separator. In using a cyclone separator, the chlorate is obtained as a slurry in mother liquor. By adjusting the amount of mother liquor contained therein, the desired proportion of sodium chloride to sodium chlorate is obtained.

The yield of chlorate crystals obtained in Example 1 is increased by about 20 percent at the same temperature by passing the mother liquor from the filtering step through a salt saturator to saturate it with additional amounts of sodium chloride prior to returning the liquor to the crystallizer. The increased salt concentration in the crystallizer increases the amount of sodium chlorate removed.

EXAMPLE 2

This example illustrates the present process using evaporative cooling in the crystallizer. The process is effected in accordance with FIG. 1 wherein liquid effluent from a group of chlorate cells is passed to a salt saturator at a temperature of 40 degrees centigrade at a rate of about 68 gallons per minute. The sodium chlorate content is about 70 pounds per 100 pounds of water and the sodium chloride concentration is about 18 pounds per 100 pounds of water. In the salt saturator, 840 pounds per hour of sodium chloride are dissolved to produce an effluent liquor from the saturator containing 70 pounds of sodium chlorate per 100 pounds of water and about 21.3 pounds of sodium chloride per 100 pounds of water at a flow rate of about 72 gallons per minute. The effluent from the salt saturator is passed to a 7,500 gallon evaporative crystallizer operating under a reduced pressure near the solution's boiling point at 25 degrees centrigrade. Water is removed in the evaporative crystallizer at a rate of about 750 pounds per hour. The average retention time of the solution in the crystallizer is about one hour and 45 minutes.

Again, crystallization of sodium chlorate occurs with the crystals settling to the bottom of the crystallizer. A stream of mother liquor and chlorate crystals is withdrawn from the crystallizer and passed through a filter to remove the precipitated sodium chlorate crystals at a rate of about 1,900 pounds per hour. The removed crystals are washed with water and the wash water and mother liquor are returned to the electrolytic cells for further electrolysis.

From a quiet zone in the crystallizer, a clear liquid effluent is withdrawn at a rate which when combined with the mother liquor from the filtering step, is equal to about 68 gallons per minute. This solution is recycled to the chlorate cells. The combined crystallizer liquid effluent for recycle has a sodium chlorate concentration of about 64.5 pounds per 100 pounds of water and a sodium chloride concentration of about 21.9 pounds per 100 pounds of water. This liquor is further adjusted with a brine solution to obtain a feed rate to the electrolytic cells of about 72 gallons per minute of a solution containing about 22 pounds of sodium chloride per 100 pounds of water.

EXAMPLE 3

This example illustrates the operation of the present invention using a feed liquor from a chlorate production process at a temperature of 80 degrees centigrade. The 80 degrees centigrade cell liquor containing 68 pounds of sodium chlorate and 18 pounds of sodium chloride per 100 pounds of water is withdrawn from the chlorate production process at a rate of about 32,000 pounds per hour. A portion of this stream is passed through a salt saturator while the remaining portion is by-passed around the salt saturator. In the salt saturator, 240 pounds per hour of sodium chloride is dissolved in the liquor. The two streams of cell liquor are then combined to result in a feed solution to the crystallizer of about 19.4 pounds of sodium chloride and 68 pounds of sodium chlorate per 100 pounds of water at a temperature of about 77.5 degrees centigrade.

The feed solution is fed to an evaporative crystallizer operating under reduced pressure near the boiling point of the solution at 25 degrees centigrade. Under such conditions, water is removed in the crystallizer at a rate of about 2,000 pounds per hour. Sodium chlorate is precipitated in the crystallizer and continuously removed from the bottom of the crystallizer as a slurry in mother liquor. The slurry is passed through a centrifuge and sodium chlorate crystals are recovered at a rate of 1,900 pounds per hour.

Liquor is also withdrawn from a quiet zone in the crystallizer at a rate which when combined with the mother liquor from the centrifuge is equal to about 28,340 pounds per hour. This liquor has a concentration of about 21.9 pounds of sodium chloride and about 64.5 pounds of sodium chlorate per 100 pounds of water. Salt and water at a rate of 630 pounds per hour of salt and 2,500 pounds per hour of water are added to the combined crystallizer effluent to provide a feed solution for further electrolysis containing about 25.2 pounds of sodium chloride per 100 pounds of water.

While there have been described various embodiments of the present invention, the methods described are not intended to be understood as limiting the scope of the invention, as it is realized that changes therein are possible. It is further intended that each element recited in any of the following claims is to be understood as referring to all equivalent elements for accomplishing substantially the same results in substantially the same or equivalent manner. It is intended to cover the invention broadly in whatever form its principles may be utilized.

What is claimed is:

1. A continuous process for crystallizing sodium chlorate from an aqueous soltuion of sodium chlorate and sodium chloride which comprises:

(a) continuously feeding an aqueous solution of sodium chlorate and sodium chloride from a reaction zone to a salt saturator;
(b) dissolving sodium chloride in said solution at a temperature between about 20 to about 100 degrees centigrade;
(c) cooling the solution by from about 10 to about 60 degrees centigrade, to obtain a solution at a temperature between about 0 to about 70 degrees centigrade and precipitated sodium chlorate,
(d) separating solid sodium chlorate from the mother liquor;
(e) saturating the mother liquor with sodium chloride and
(f) continuously feeding the saturated mother liquor from step (e) to the solution in step (c).

2. The method of claim 1 wherein the mother liquor from step (d) is resaturated with sodium chloride and returned to the reaction zone.

References Cited

UNITED STATES PATENTS

| | | | |
|---|---|---|---|
| 975,613 | 11/1910 | Gartenmeister | 23—85 |
| 2,000,414 | 5/1935 | Neukirch | 23—85 |
| 3,323,875 | 6/1967 | Been. | |
| 3,341,288 | 9/1967 | Patridge et al. | |

OTHER REFERENCES

Department of Commerce, Advance Release for Monday, August 9, 1948, OTS–1154, pp. 1 and 2, note particularly citation of Report PB– 77712, Manufacture of Chlorates and Perchlorates at Bitterfeld, Copy in Library of Congress, Washington, D.C.

Seidell: Solubilities of Inorganic and Organic Compounds, vol. I, 1919, N.Y., pp. 513 and 639.

WILBUR L. BASCOMB, Jr., Primary Examiner

U.S. Cl. X.R.

23—85; 159—45; 204—95